No. 771,691. PATENTED OCT. 4, 1904.
W. E. ALLINGTON.
METHOD OF SEPARATING DUST FROM DUST LADEN AIR.
APPLICATION FILED JUNE 2, 1904.
NO MODEL.
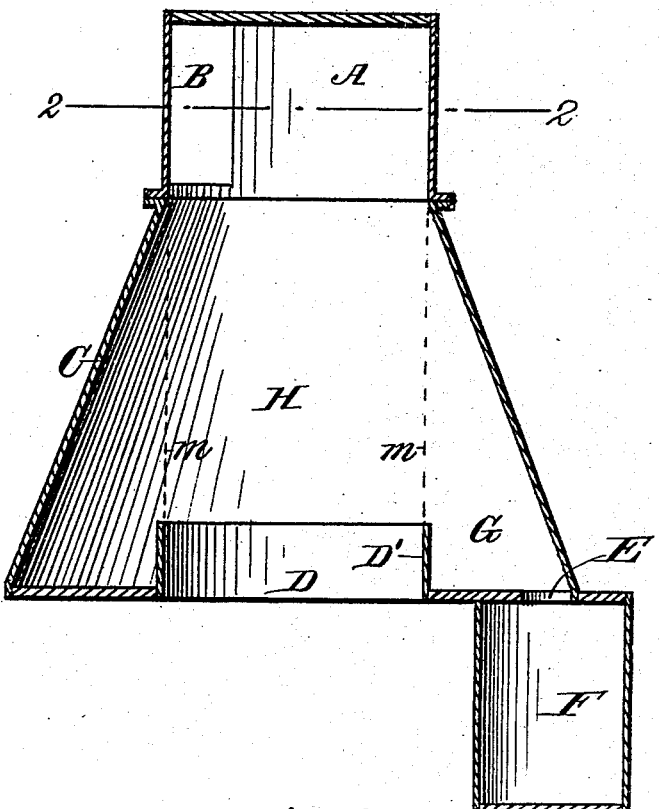
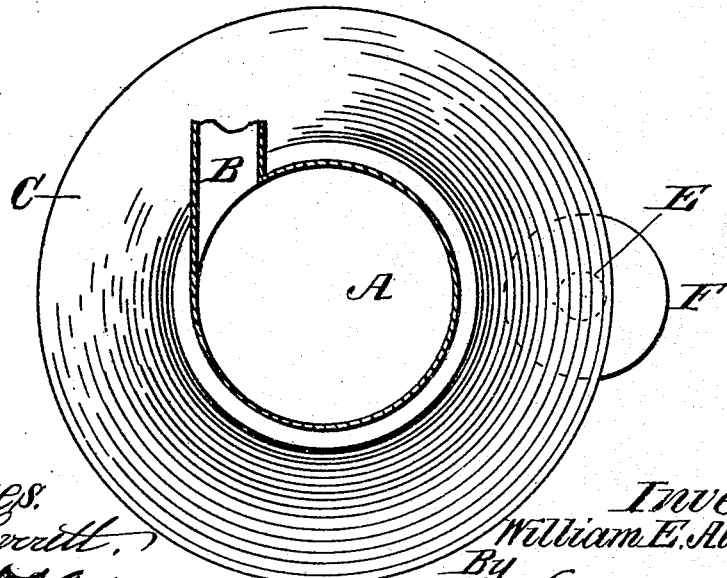
Witnesses:
Robert Everitt
N. L. Bogan
Inventor:
William E. Allington.
By Edward Taggart
Atty.

No. 771,691.

Patented October

UNITED STATES PATENT OFFICE

WILLIAM E. ALLINGTON, OF SAGINAW, MICHIGAN.

METHOD OF SEPARATING DUST FROM DUST-LADEN AIR.

SPECIFICATION forming part of Letters Patent No. 771,691, dated October 4, 1904.

Application filed June 2, 1904. Serial No. 210,888. (No model.)

*To all whom it may concern:*

Be it known that I, WILLIAM E. ALLINGTON, a citizen of the United States, residing at Saginaw, in the county of Saginaw and State of Michigan, have invented new and useful Improvements in Methods of Separating Dust from Dust-Laden Air, of which the following is a specification.

This invention relates to a new and useful method of separating dust from dust-laden air, and has for its principal object the delivering of the purified air into the atmosphere with the least possible retarding influence.

The method further aims to separate dust from the air by means of the rotary or centrifugal motion of the dust-laden air within any suitable chamber or receptacle, to prevent back pressure on the means used for producing the air-current, to secure the highest efficiency possible from the rotary movement of the air for separating dust, to maintain as near as possible the initial velocity of the entering air-current to the point of free delivery, and to produce a rapidly-rotating column of air within a less-rapidly-revolving body of air surrounding said column and without any obstructions between the rotating column and the rotating outer body.

To more clearly illustrate and set forth the method, reference is had to the accompanying drawings, which show one form of an apparatus in which the method can be carried out.

In the drawings, Figure 1 is a central vertical section, and Fig. 2 is a sectional plan on line 2 2 of Fig. 1.

The apparatus shown in which the method can be carried out consists of a receptacle forming a chamber A, preferably cylindrical in form, into which is projected a current of dust-laden air through the inlet B. The inlet B in the example of my invention shown in the drawings is attached to the receptacle tangentially, thereby imparting a very rapid rotary motion to the dust-laden air projected into said chamber. The chamber A opens into a larger chamber, (shown by C.) Opposite the open end of the chamber A and in the enlarged end of the chamber C is the purified-air outlet or opening, which is shown by D and of substantially the same diameter as the chamber A. The outlet D is surrounded by an inwardly-projecting guard D'. The dust-laden air projected into the chamber A tangentially is given a very rapid revolving motion, which rapidly-revolving motion continues through the center of the chamber C and which motion is continued substantially unabated until the purified air passes through the opening D. The location of the column of rapidly-revolving air is indicated in the drawings by H, and the line between the column and the outward body is shown by the dotted lines *m m*. G indicates the location of the surrounding body of air, which revolves less rapidly than the revolving column H and receives its impulse from said column H. The result is that the dust in the dust-laden air is thrown by centrifugal force from the rapidly-revolving column H into the surrounding revolving body G, and the revolution of the air in the surrounding body G is sufficient to project the dust against the inner surface of the wall of chamber C, from whence it passes downwardly in spiral curves through the medium of a thin spiral current of air passing downwardly toward the outlet end of the chamber C and is discharged through the opening E into a suitable receptacle F. The air passing from chamber A direct to the outlet D is in no way retarded in its movement, and the dust in passing from the column H to the surrounding body G causes no back pressure upon the fan, and the separation of dust from the dust-laden air is substantially perfect.

I have shown one and a very simple form of apparatus for carrying out the method of separating dust from air; but it will be understood that many other forms of apparatus may be used wherein a central column of rapidly-revolving dust-laden air is surrounded by a body of air revolving less rapidly.

Having thus described my invention, what I claim to have invented, and desire to secure by Letters Patent of the United States, is—

The method of separating dust from the initial current of dust-laden air, which consists in continuously and rapidly rotating a central column of dust-laden air within an outer surcontinuously-rotating body of air
locity receiving its impulse from said
and into which the dust separated
id column is driven, and then continu-
delivering the dust from said body of
locity by the action of said body while
rified air continuously escapes from one
f the column of high velocity.

In testimony whereof I have hereunto set my hand in presence of two subscribing witnesses.

WILLIAM E. ALLINGTON.

Witnesses:
 FREDERICK C. GOODWIN,
 L. F. McCREA.